Nov. 16, 1954  E. R. PRICE  2,694,468
TRACTOR-TRAILER BRAKE SYSTEM
Filed March 9, 1951  5 Sheets-Sheet 3

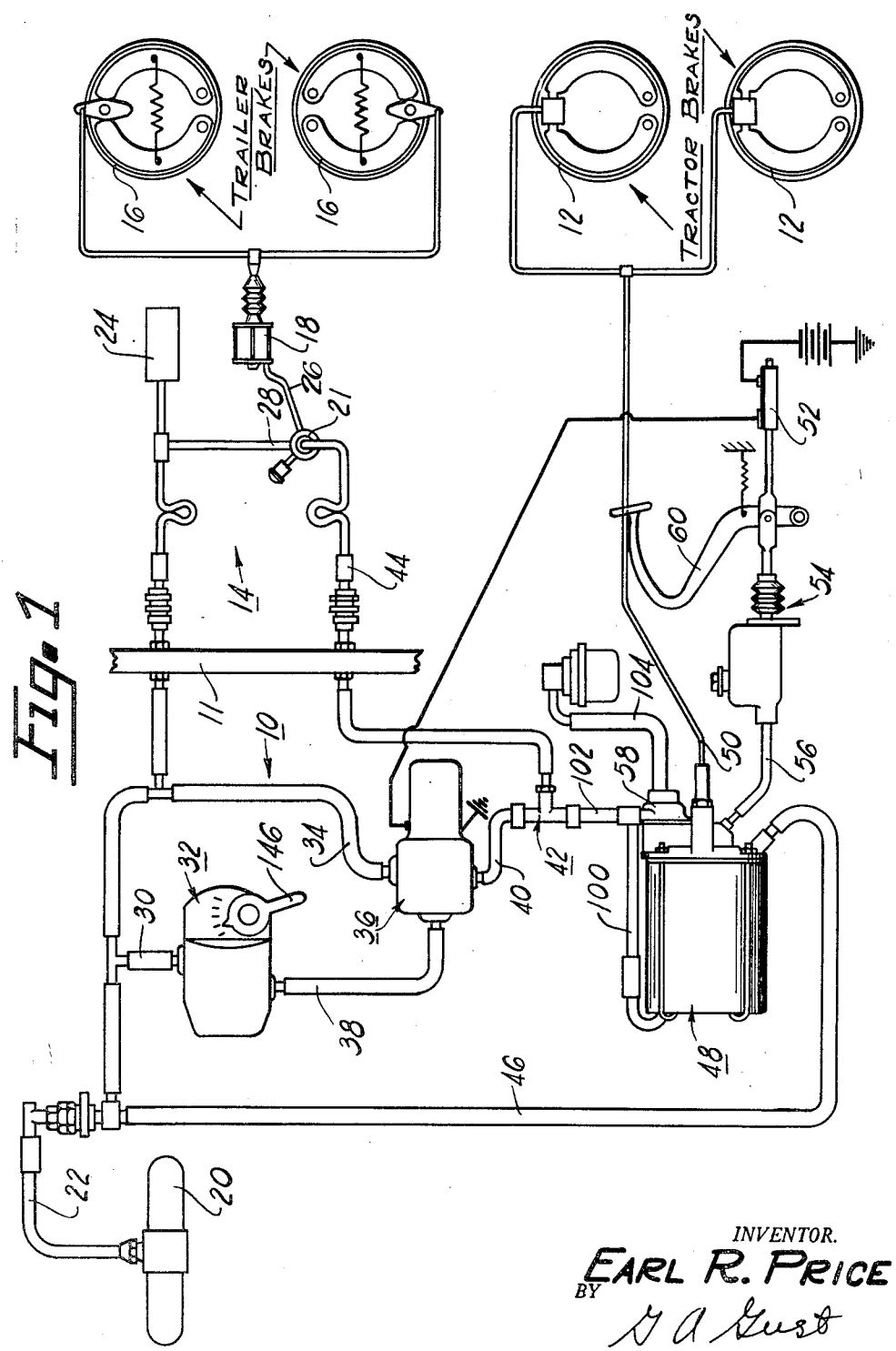

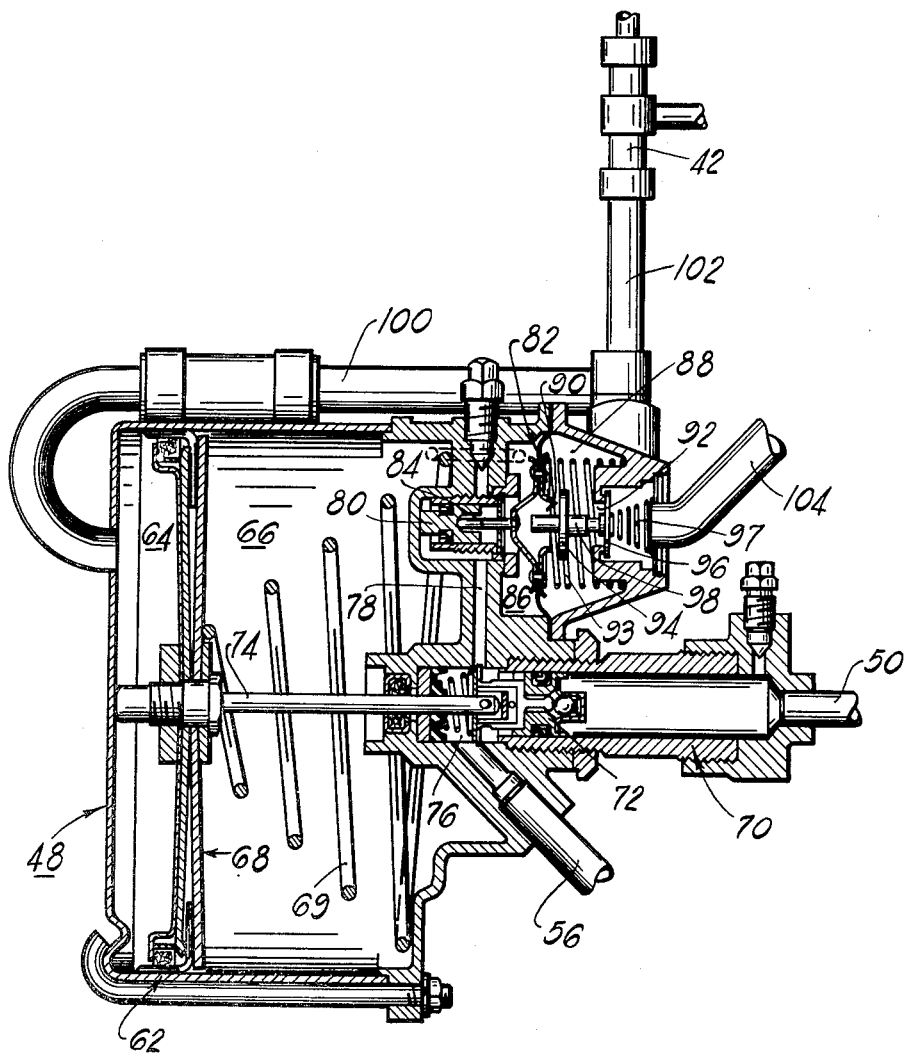

INVENTOR.
EARL R. PRICE
BY
ATTORNEY

INVENTOR.
EARL R. PRICE
BY
ATTORNEY

Nov. 16, 1954  E. R. PRICE  2,694,468
TRACTOR-TRAILER BRAKE SYSTEM
Filed March 9, 1951  5 Sheets-Sheet 5
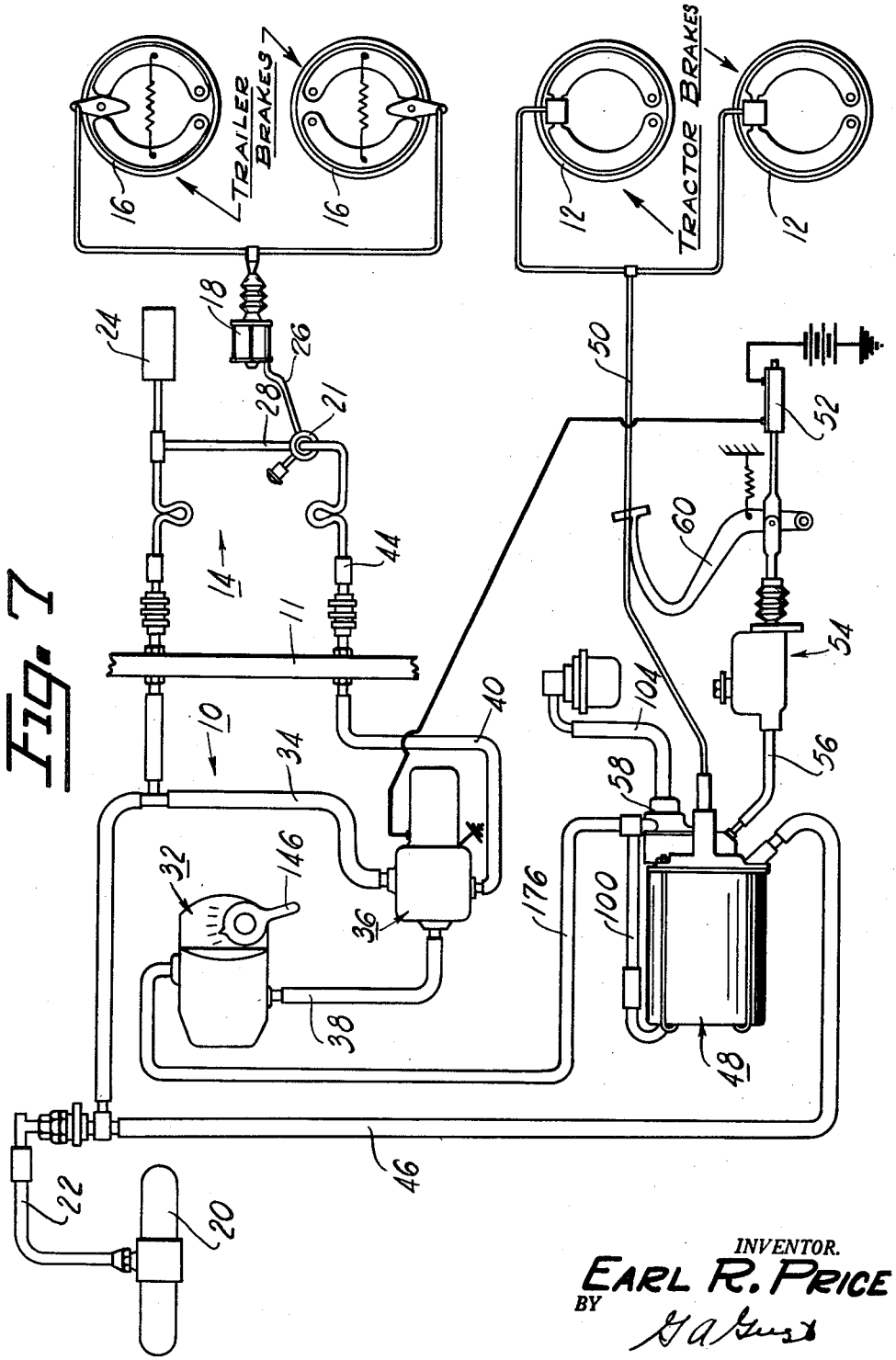
INVENTOR.
EARL R. PRICE
BY
*GA Gust*
ATTORNEY United States Patent Office 2,694,468
Patented Nov. 16, 1954

2,694,468

TRACTOR-TRAILER BRAKE SYSTEM

Earl R. Price, South Bend, Ind., assignor to Bendix Aviation Corporation, South Bend, Ind., a corporation of Delaware Application March 9, 1951, Serial No. 214,747

12 Claims. (Cl. 188—3)

The present invention relates to a tractor-trailer braking system, and particularly to a system which provides application of the trailer brakes slightly ahead of the tractor brakes without postponing the normal application of the tractor brakes.

Price Patent No. 2,429,194 discloses a tractor-trailer brake control system which includes means for causing an "advance" application of the trailer brakes with respect to the tractor brakes. In accomplishing this "advance" trailer braking, the tendency of the trailer to "ride up" onto the tractor is reduced, and the tendency of the trailer to "jack-knife" upon application of the brakes is likewise reduced.

The "advance" trailer braking with which this invention is concerned provides braking of the trailer ahead, in time, of the normal application of the tractor brakes. This "advance" braking differs from the often confused system which provides braking of the trailer ahead of the tractor, but accomplishes this by retarding the normal application of tractor brakes. This "retarding" system takes advantage of the lapse of time it normally takes for transmitting air pressure, originating on the tractor from the tractor to the trailer which is naturally greater than the time lapse for the same pressure to travel to the tractor brakes. By preventing the communication of pressure to the tractor brakes until the trailer brakes are applied, the trailer brakes are applied ahead of the tractor brakes. Obviously, the inherent disadvantage of this "retarding" system is the time lag in obtaining tractor brake application which could, in a given emergency situation, be the cause of disastrous consequences. The system of the present invention does not interfere with the normal application of the tractor brakes, but, at the same time, achieves "advance" braking of the trailer.

The effectiveness of brakes in retarding motion of vehicles is well known to be primarily due to the friction between the vehicle wheels and the road surfaces. This friction varies with the change in road conditions from dry to wet, etc., and also with the variation in vehicle weight from empty to loaded and vice versa. Thus, a given effort by the operator of a vehicle which produced effective, efficient braking on dry pavement, could result in skidding of the wheels on wet pavement with the consequent loss of steerability and efficient deceleration of the vehicle. In tractor-trailer vehicles, skidding of the trailer wheels is obviously undesirable since the trailer tends to swing out of trailing alignment with the tractor, or in other words, to jack-knife.

It is, therefore, an object of the present invention to provide a braking system for a tractor-trailer train which is capable of providing advance braking of the trailer, the degree of such advance braking effort being adjustable to meet varying road and vehicle loading conditions.

It is another object to provide an advance braking system which applies the trailer brakes with a selected degree of effort ahead of the tractor brakes, without postponing the normal application of the tractor brakes, after which the trailer brakes "wait" until a predetermined ratio between tractor and trailer braking has been reached and then apply thereafter according to this ratio.

It is still another object to provide an advance braking system which is preadjustable to produce the desired, initial trailer braking effort and which will maintain a ratio of braking effort between the tractor and trailer up to maximum available effort at which time the ratio will be reduced to unity and the same forces will be transmitted to both tractor and trailer brake systems.

Other objects will become apparent as the description proceeds.

In the drawings:

Figure 1 is a diagrammatic illustration of an embodiment of the present invention showing a tractor-trailer hook-up;

Figure 2 is a sectional illustration of the tractor power device and system control valve of Figure 1;

Figure 7 is a diagrammatic illustration of another embodiment of this invention.

Figure 4:
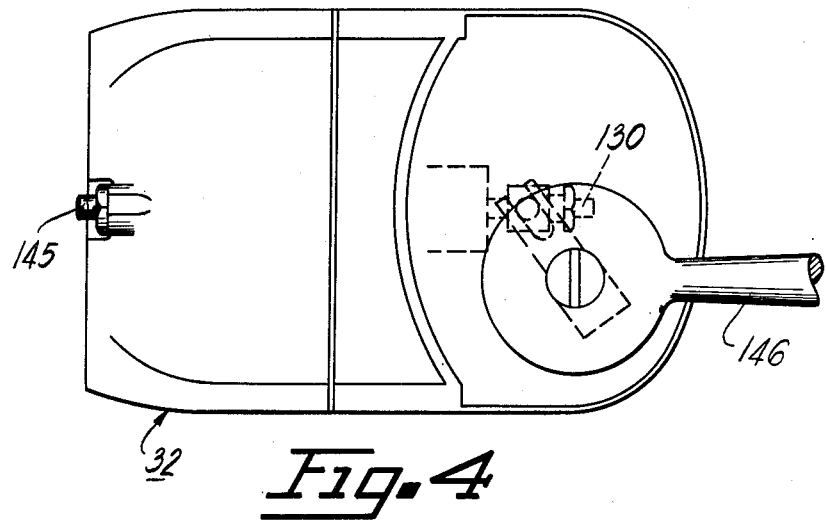
Figure 4 is a top plan view of the valve of Figure 3.

Referring now to the drawings, and more particularly to Figure 1, tractor 10, indicated as being to the left of a section of connecting frame 11, having rear wheel brakes 12 is shown coupled to trailer 14, to the right of frame 11 and having brakes 16. A power device or cylinder 18 of any vacuum or atmospheric suspended type (illustrated as atmospheric) is carried by trailer 14 and is connected to apply the trailer brakes 16.

The tractor 10 carries an intake manifold 20 which is utilized as a source of vacuum for the braking system, and which is connected by means of a conduit 22 to the trailer vacuum reserve tank 24. This tank 24 has a branch conduit 28 which leads to a conventional relay conversion type valve 21, the purpose of the valve 21 being to speed up response of the trailer power cylinder 18 to operation of the braking system. A conduit 26 leads from valve 21 to the power cylinder 18.

A branch conduit 30 from vacuum line 22 leads to regulator valve 32, and another branch conduit 34 leads to a solenoid or advance valve 36. The output of regulator valve 32 is fed into the advance valve 36 by means of a conduit 38. The output of the advance valve 36 is fed through a conduit 40, a transfer valve 42, and another conduit 44 to the valve 21. Obviously, the valve 36 could be physically combined with valve 32, so in the claims, the combination of the two valves may be covered by the term "advance valve means."

A line 46 branches off the vacuum line 22 and feeds a tractor power device 48. This device 48 is illustrated as being of the differential air pressure type which, upon actuation, develops a hydraulic pressure which is transmitted by means of the pipe 50 to the tractor brakes 12. This power device 48 is actuated by means of a conventional pedal and hydraulic master cylinder arrangement generally indicated by the reference numeral 54, the hydraulic output of the master cylinder being fed into the device 48 by means of the pipe 56. This master cylinder output is fed through suitable passages in the device 48 and is utilized to operate a control valve fastened to device 48 and generally indicated by the reference numeral 58. The output of the control valve 58 is fed into one branch of the transfer valve 42 for controlling communication between this valve 58 and the relay valve 21 of the trailer 14.

An electrical switch 52 is operatively connected to the brake pedal to control actuation of advance valve 36 which, in the present instance, is a poppet type valve operated by means of an electrical solenoid.

It may be stated at this point, that operation of the brake pedal 60 serves to first operate the advance valve 36 for connecting the conduits 38 and 40 together to transfer a predetermined air pressure normally built up in regulator valve 32 to the trailer brake system and thereby partially apply the trailer brakes. Further depression of the brake pedal 60 serves to operate the control valve 58 which functions to transmit an air pressure to the tractor power device 48 and also to the trailer brake system by way of the transfer valve 42. In order to provide a clear understanding of how the present invention is constructed and how it functions, a description of each of the component parts of the system will now be made.

The power device 48, as shown in Figure 2, comprises a power chamber 62 which is divided into two variable volume chambers 64 and 66 by means of a power piston 68. A frusto-conically shaped spring 69 biases piston 68 to its illustrated, released position. A hydraulic slave cylinder 70 extends substantially co-axially outwardly from the right-hand end of the chamber 62, and reciprocably carries a piston 72 connected to the power piston 68 by means of a push rod 74. Reciprocatory motion of the power piston 68 will be transmitted to slave piston 72, this slave piston 72 serving the purpose of developing hydraulic pressure which is transmitted by means of conduit 50 to the tractor brakes 12. The manually operated master cylinder 54 feeds through line 56 into chamber 76 located immediately behind slave piston 72. This chamber 76 is in turn connected by means of a passage 78 to the head end of control valve piston 80 which is in turn connected to a pressure responsive diaphragm 82 by means of a thrust link 84. This diaphragm 82 separates two variable volume chambers 86 and 88; chamber 86 being constantly connected to a vacuum source and power chamber 66, and chamber 88 being connected at times to chamber 86 by means of valve opening 90 in diaphragm 82 and at other times to the atmosphere by means of the port 92. A spring 93 biases diaphragm 82 and piston 80 to the left. Two poppet type valves 94 and 96 control the opening and closing of the two valve ports 90 and 92, respectively, these valves being spaced apart by means of a connecting pin 98. As illustrated, the control valve 58 is in released condition, the valve 96 closing the atmosphere port 92, and valve 94 being spaced from the vacuum port 90 so as to provide vacuum communication between the chambers 86 and 88. A conduit 100 leads from the control chamber 88 to the power chamber 64 so that the power piston 68 is actually submerged in vacuum during brake release. A branch conduit 102 leads from the control chamber 88 to the transfer valve 42.

The control valve 58 is operated as follows. By depressing the brake pedal 60, liquid pressure is transmitted through conduit 56, and against the head end of piston 80. Diaphragm 82 is forced to the right and vacuum port 90 seats upon and is closed by the valve 94. Continued movement of the diaphragm 82 forces valve 96 off its seat allowing air at atmospheric pressure to enter by means of the air tube 104, which may be connected to any conventional air filter to prevent the entrance of foreign matter in the control valve 58, through the atmospheric port 92 and into the control chamber 88 from which it passes through the conduits 100 and 102. The air pressure in chamber 64 is thereby increased and acts to move the piston 68 to the right. Slave cylinder piston 72 is accordingly moved to the right and transmits hydraulic pressure to the tractor brakes 12.

Since the air which enters the control chamber 88 acts against the diaphragm 82 and the vacuum in chamber 86, the diaphragm 82 will be forced to the left allowing spring 97 to move valve 96 to close atmospheric port 92. When this happens, both ports 90 and 92 are closed and the valve is said to be in lapped condition.

The pressure in control chamber 88 is now stabilized, thus stopping the rightward movement of the power piston 68. By further depression of the brake pedal 60, the braking cycle is repeated and additional pressure is introduced into chamber 64 which provides more braking force for the brakes 12.

Figure 3:
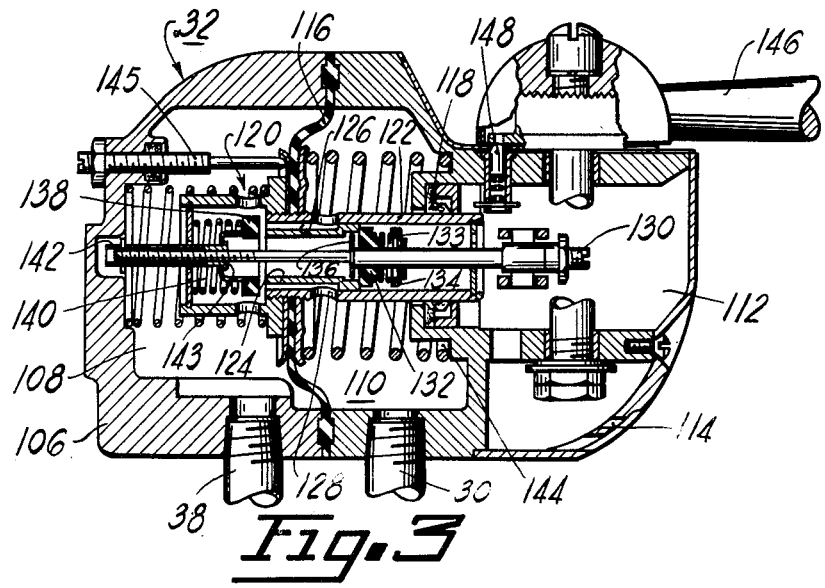
Figure 3 is a sectional illustration of the regulator valve of Figure 1.

Figure 3 illustrates the regulator valve 32 which is identical to the valve illustrated and claimed in Price Patent No. 2,301,321. This valve 32 operates in the same manner as it is intended to operate in the aforementioned patent, but is used in a slightly different manner which will be described hereafter.

This valve comprises a casing 106 divided into three chambers, a control chamber 108, a vacuum chamber 110, and an atmospheric pressure chamber 112. In the system, control chamber 108 is connected to pipe 38, vacuum chamber 110 to pipe 30, and air chamber 112 is ported to the atmosphere by means of an opening 114. Chambers 108 and 110 are separated by means of a diaphragm 116, and chambers 110 and 112 are separated by means of a rubber or the like annular seal 118.

Diaphragm 116 carries a valve mechanism generally indicated by reference numeral 120. This mechanism 120 comprises a control tube 122 arranged to reciprocate the seal 118. A smaller tube 124 having a stepped diameter is press fitted into the tube 122 and provides an annular passage 126 which communicates with control chamber 108 and vacuum chamber 110 by means of the radial openings 128 in the tube 122. A control rod 130 projects through the mechanism 120 and carries between its ends an annular valve 132 which is biased toward the left by means of a spring 133 which engages a retainer 134 fixedly secured to the rod 130. An annular shoulder 136 is formed on the rod 130 and is arranged to engage the left side of valve 132. As illustrated, the valve 132 closes the right hand end of the inner tube 124 so as to prevent communication between chambers 112 and 108. The left hand end of rod 130 carries another valve 138 which controls the opening and closing of the annular passage 126. This valve 138 is so arranged that upon movement of rod 130 toward the right, annular passage 126 will be closed by reason of the force of the spring 140. A nut 142 is threaded on the left hand end of the rod 130 and carries a radial flange 143 on its right hand end which engages a portion of the valve 138 so as to lift this valve out of closing relation with the passage 126 upon sufficient leftward movement of rod 130.

A comparatively heavy, graduating spring 144 is interposed between the casing 106 and the diaphragm 116, and a stop 145 is secured to casing 106 to engage the opposite side of diaphragm 116, spring 144 having sufficient strength to maintain said diaphragm in engagement with stop 145 during release condition of valve 32. The position of the rod 130 in the valve mechanism 120 is manually determined by means of a lever 146 which is designed to be selectively located at any one of a number of predetermined angular positions. A detent locating arrangement, such as the one illustrated at 148, may be used for this purpose, and each position of the handle 146 may be calibrated in inches of mercury air pressure. This lever 146 and the right hand end rod of 130 are so connected that by swinging the lever 146 the rod 130 will be moved longitudinally.

Operation of this valve 32 is as follows: with the parts in the illustrated position, vacuum is communicated from chamber 110 to chamber 108 by means of the annular passage 126 and air in chamber 112 is prevented from communicating with chamber 108 by means of the valve 132. Upon movement of the handle 146 to the desired position, for example, a position corresponding to five inches of mercury, the control rod 130 will be moved to the right allowing valve 138 to cover the open end of passage 126 under the force of spring 140. Next, the annular shoulder 136 engages and then unseats valve 132 allowing air to flow from chamber 112 into control chamber 108. As the pressure rises in chamber 108, it will act against diaphragm 116 forcing it to the right against the vacuum in chamber 110 and the graduating spring 144. Upon sufficient movement of diaphragm 116, the right hand end of the inner tube 124 will engage and be closed by the valve 132 thus cutting off the flow of air into chamber 108. Valve 138 remains closed inasmuch as the spring 140 is so designed as to exert sufficient closing pressure. At this stage, the valve 32 is said to be lapped, and the pressure in chamber 108 will be five inches of mercury corresponding to the selected setting of handle 146. Other positions of handle 146 will obviously result in the creation of corresponding pressures in chamber 108. The valve mechanism 120 is so sensitive that should the pressure in chamber 108 vary from that selected, the valve mechanism will respond and open the proper ports until the pressure returns to that originally selected.

It should be understood at this point that this valve 32 determines the initial and immediate effort for applying the trailer brakes upon actuation of the tractor-trailer braking system.

Figure 5:
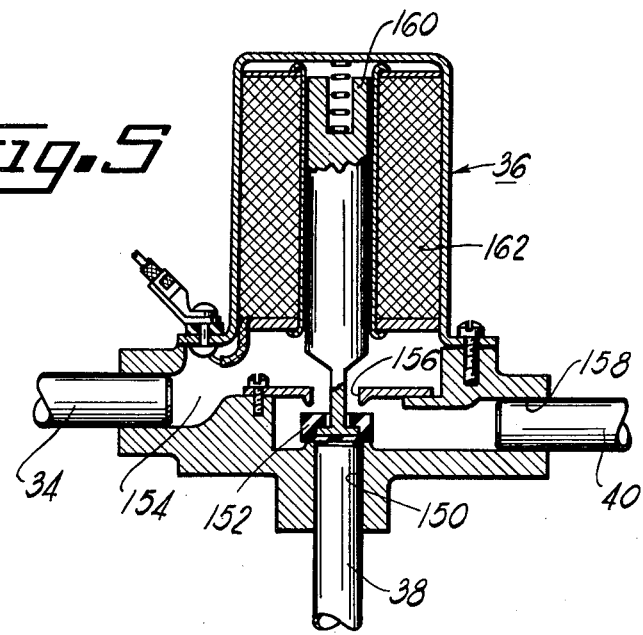
Figure 5 is a sectional illustration of the advance valve of Figure 1.

Referring next to Figure 5, the advance valve 36 is arranged to control the output of control chamber 108 of regulator valve 32, this valve 36 having an inlet passage 150 controlled by a valve element 152. This valve 36 is provided with a vacuum chamber 154 having a valve opening 156, the opening and closing of which are controlled by the valve 152. Chamber 154 and passages 150 are thereby arranged to be selectively communicated with the outlet passage 158 by means of the valve element 152. This valve 152 is connected to a solenoid plunger 160 reciprocably carried inside the electrical coil 162. Operation of this valve 36 is brought about during the first fraction of an inch movement of the brake pedal 60 which closes the switch 52 to complete an energizing circuit through the solenoid for lifting the valve 152 from its illustrated position and into closing relation with the port 156. When this occurs, communication is established directly from the control chamber 108 or regulator valve 32 to the transfer valve 42.

Figure 6:
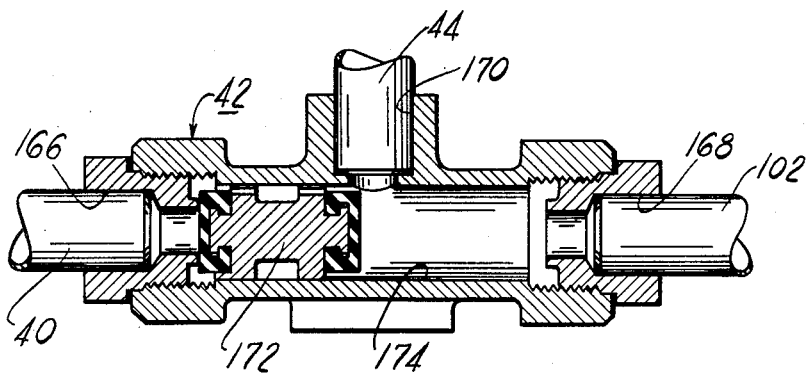
Figure 6 is a sectional illustration of the transfer valve of Figure 1.

Referring to Figure 6, this transfer valve is T-shaped, and is provided with three ports, port 166 communicating with conduit 40, port 168 communicating with conduit 102, and port 170 communicating with conduit 44. A shuttle valve 172 reciprocates in the bore 174, and is arranged to close either the port 168 or the port 166. If the pressure in conduit 102 is below that in conduit 40, the valve 172 will be moved to close the port 168 whereby only conduits 40 and 44 will be in communication. If the reverse condition is true, that is, the pressure in conduit 40 is less than that in conduit 102, the valve 172 will move to close off port 166, communication thereby being established solely between conduit 102 and 44.

Now having described the various component parts of the system of the present invention, the operation of this system will now be described.

Under normal running conditions, with the brakes released, vacuum will be communicated to the power device 48 on the tractor. Vacuum will also be communicated through the advance valve 36 from which it is carried by means of conduits 40 and 44 to the trailer relay valve 21, or, alternatively, through control valve 58, conduits 102 and 44 to relay valve 21, depending upon the position of shuttle valve 172 in transfer valve 42. The operator of the tractor-trailer, having judged in advance the amount of advance trailer braking effort he desires for the road conditions being encountered, moves the handle 146 of the regulator valve to a position which he knows from previous teachings or experience will give him the desired braking effect. When this happens the regulator valve 32 will automatically develop in the control chamber 108 a pressure which corresponds to the setting of handle 146, since the valve 152 of advance valve 36 prevents communication between conduits 38 and 40, and valve 36 will act to establish and maintain in chamber 108 a predetermined air pressure for trailer braking purposes.

Upon initial movement of the pedal 60, switch 52 will be closed and solenoid 162 energized. Valve 152 will open the passage 150 and close the vacuum port 156, thereby bringing conduits 38 and 40 into communication. The reserve air pressure then flows from chamber 108 of valve 32 to port 166, and since the pressure in conduit 102 is at vacuum level, the valve 172 will be moved to close the port 168. The air pressure then enters conduit 44 by which it is transmitted to relay valve 21. This relay valve 21 operates in the conventional manner and causes a differential pressure to be created in the power chamber 18 for applying the trailer brakes 16 ahead of the tractor brakes 12. Further depression of the brake pedal 60 develops a hydraulic pressure in the master cylinder 54 which is transmitted by way of line 56 to the control valve 58. Once the control valve 58 is operated, air enters conduits 100 and 102, the increase in pressure in conduit 100 serving to apply the tractor brakes, while the pressure in conduit 102 encounters the closed port 168. When the brake pedal 60 has been depressed sufficiently to operate the control valve 58 to such an extent that the pressure delivered into conduit 102 exceeds that in conduit 40, the shuttle valve 172 will traverse the bore 174 and close port 166 thereby establishing communication from conduit 102 to conduit 44. It is obvious that when and after this occurs the control valve 58 solely controls the braking pressures delivered to both the power devices 18 and 48, and also destroys the degree of advance braking of the trailer.

For wet or icy pavement conditions, it has been found that the advance braking of the trailer should not be as great as it would be for ideal, dry road conditions. The exact setting of the handle 146 of regulator valve 32 will be largely determined by experience, and will obviously vary with changing road conditions and weight of the vehicle.

Referring now to Figure 7, a slight modification of the system is provided which will produce an advance braking of the trailer and at the same time maintain this advance over tractor braking until maximum braking effort has been reached. This modification eliminates the transfer valve 42 and connects the conduits 40 and 44 together. The conduit 102 leading from the control valve 58 is also eliminated and one substituted therefor as indicated by reference numeral 176 which is connected to vacuum chamber 110 of the regulator valve 32 in the place of the conduit 30. Thus, with this arrangement initial vacuum for valve 32 is derived from the control valve 58 and the advance trailer braking action will be the same as before. The only difference in operation is that as the control valve 58 delivers slight increases in pressure into conduits 100 and 176, these increases will flow into regulator valve chamber 110. Since the regulator valve 32 is normally lapped, a slight increase in pressure in chamber 110 will move the diaphragm to the left until valve 132 engages control rod shoulder 136 to open communication from air chamber 112 to the control chamber 108. With the consequent increase in pressure in chamber 108, the diaphragm 116 will be forced to the right thereby causing the valve mechanism 120 to lap. Thus, for every increment of air pressure delivered into chamber 110 by the control valve 58, a similar charge of air will be introduced into chamber 108 and flow through the lines 38, 40, and 44 to the trailer braking system. Thus it is seen that the trailer brakes will be applied, in point of time, ahead of the tractor brakes and will likewise maintain a value of operating air pressure or baking effort which will be above that of the tractor system until maximum braking is reached. This maximum braking will occur when full atmospheric pressure is communicated to both the tractor and trailer power devices, 48 and 18.

Although a plurality of embodiments of the invention have been illustrated and described, various changes in the form and relative arrangements of the parts may be made to suit requirements.

I claim:

1. A power braking system for a tractor-trailer combination comprising a differential air pressure power device for operating the tractor brakes, a differential air pressure power device for operating the trailer brakes, a control valve operatively connected to both of said devices, and means for actuating said trailer power device with a predetermined pressure ahead of the actuation of said tractor power device without postponing the normal operation of said tractor power device, said means including a regulatable device arranged to establish for trailer braking purposes a predetermined air pressure, means accessible to an operator while the tractor-trailer to be controlled is in motion for manually presetting said last-named device depending upon road and load conditions, the value of such last mentioned air pressure depending upon the presetting of said latter device, said first named means further including a valve which will release said established air pressure for initially operating said trailer power device, and a manually operable control operatively connected to said control valve and said release valve for operating the entire tractor-trailer power braking system.

2. A system providing advance power braking for the trailer of a tractor-trailer combination comprising a manually operable control for operating the entire tractor-trailer braking system, differential air pressure means arranged to establish for trailer braking purposes a predetermined air pressure, an operator-operated regulating device accessible to the operator while the tractor-trailer to be controlled is in motion, operatively connected to said air pressure means and regulatable to preset the aforementioned predetermined air pressure and means operatively connected to said manually operable control for controlling the release of said established air pressure for transmission to the trailer portion of the tractor-trailer braking system.

3. A system providing advance power braking for the trailer of a tractor-trailer combination comprising a manually operable control for operating the entire tractor-trailer braking system, differential air pressure means accessible to an operator while the tractor-trailer is in motion for manually presetting a predetermined air pressure therein depending upon road and load conditions having a compartment divided into two variable volume chambers by a pressure responsive member, valve mechanism operatively connected to said member and automatically operable upon movement of said member to provide in one of said chambers a predetermined air pressure for advance trailer braking purposes, and means operatively connected to said manually operable control for controlling the release of said predetermined air pressure for transmission to the trailer portion of the tractor-trailer braking system.

4. A system providing advance power braking for the trailer of a tractor-trailer combination comprising a manually operable control for operating the entire tractor-trailer braking system, differential air pressure means having a compartment divided into two variable volume chambers by a pressure responsive member, valve mechanism operatively connected to said member and automatically operable upon movement of said member to control the air pressure in one of said chambers, a manually manipulable device operatively connected to said valve mechanism and operable to preset said valve mechanism to select the degree of air pressure to be built up in one of said chambers, and means operatively connected to said manually operable control for controlling the release of said selected pressure for transmission to the trailer portion of the tractor-trailer braking system.

5. A power braking system for a tractor-trailer combination comprising a differential air pressure power device for operating the tractor brakes, a differential air pressure power device for operating the trailer brakes, a control valve operatively connected to both of said devices, and differential air pressure means for actuating said trailer power device with a predetermined pressure ahead of the actuation of said tractor power device without postponing the normal operation of said tractor power device, said means having a compartment divided into two variable volume chambers by a pressure responsive member, valve mechanism operatively connected to said member and automatically operable upon movement of said member to vary the pressure in one of said chambers, one of said chambers being arranged to have established therein for trailer braking purposes a predetermined air pressure, a manual control device for preselecting the degree of such latter pressure at will of an operator said means including a valve which will release said established air pressure for initially operating said trailer power device, and a manually operable control operatively connected to said control valve and said means for operating the entire tractor-trailer power braking system.

6. In a tractor-trailer braking system having a power device for operating the trailer brakes, a power device for operating the tractor brakes, a manually operable control member, and a control valve responsive to operation of said control member for controlling the actuation of both tractor and trailer power devices; an advance valve means for actuating said trailer power device ahead of said tractor power device and having a compartment divided into two variable volume chambers by a pressure responsive member, one of said chambers being arranged to control the actuation of said trailer power device and the other of said chambers being arranged to communicate with a controlled pressure, valve mechanism operatively carried by said member and arranged to connect said two chambers together at certain times and to connect said one chamber to a pressure source at other times, a manually manipulable device operatively connected to said valve mechanism and operable to select the degree of pressure to be stored in said one chamber, and a valve responsive to operation of said control member for releasing said stored pressure for operating said trailer power device.

7. In a tractor-trailer braking system having a power device for operating the trailer brakes, a power device for operating the tractor brakes, a manually operable control member, and a control valve responsive to operation of said control member for controlling the actuation of both tractor and trailer power devices; an advance valve means for actuating said trailer power device ahead of said tractor power device and comprising a chamber for having developed therein air under varying degrees of pressure, valve means movable to vary the air pressure developed in said chamber, manual means for selecting the degree of developed pressure, and a valve responsive to operation of said control member for releasing said developed pressure for operating said trailer power device.

8. In a tractor-trailer braking system having a power device for operating the trailer brakes, a power device for operating the tractor brakes, a manually operable control member, and a control valve responsive to operation of said control member for controlling the actuation of both tractor and trailer power devices; an advance valve means for actuating said trailer power device ahead of said tractor power device and comprising a chamber for having developed therein air under varying degrees of pressure, a valve responsive to operation of said control member for releasing said developed pressure for operating said trailer power device, and manually adjustable valve means for selecting the degree of air pressure to be developed in said chamber for use in initially applying the trailer brakes.

9. In a tractor-trailer braking system having a power device for operating the trailer brakes, a power device for opertaing the tractor brakes, a manually operable control member, and a control valve responsive to operation of said control member for controlling the actuation of both tractor and trailer power devices; an advance valve means for actuating said trailer power device ahead of said tractor power device and comprising an adjustable regulator valve having a chamber for having developed therein air under pressure, said regulator valve having regulating means responsive to adjustment whereby a selected air pressure will be automatically developed in said chamber, a valve responsive to operation of said control member for releasing said selected developed pressure for operating said trailer power device, and a transfer valve connected between said trailer power device and said last mentioned valve and between said trailer power device and said control valve, said transfer valve providing sole communication between said regulator valve and said trailer power device until said control member has been moved sufficiently to cause said control valve to develop a pressure exceeding the value of the chamber developed pressure whereupon said transfer valve will operate to cut off said regulator valve communication and provide communication between said control valve and said trailer power device.

10. In a tractor-trailer braking system having a power device for operating the trailer brakes, a power device for operating the tractor brakes, a manually operable control member, and a control valve responsive to operation of said control member for controlling the actuation of both tractor and trailer power devices; an advance valve means for actuating said trailer power device ahead of said tractor power device and comprising an adjustable regulator valve having a chamber for having developed therein air under pressure, said regulator valve having regulating means responsive to adjustment whereby air under varying degrees of pressure will be automatically developed in said chamber, said regulating means including a manual control device for preselecting the degree of pressure to be developed in said chamber and electrical means, including a switch operatively connected to said control member, for releasing said selected developed pressure for operating said trailer power device.

11. In a tractor trailer braking system having a power device for operating the trailer brakes, a power device for operating the tractor brakes, a manually operable control member and a control valve responsive to operation of said control member for controlling the actuation of both tractor and trailer power devices; means for actuating the trailer power device in advance of the tractor power device comprising an advance valve unit having a chamber adapted to have established therein a supply of air under varying degrees of pressure for advance trailer braking purposes, valve means adjustable to vary the pressure in said chamber, a manual control member for said valve means located within reach of an operator of the vehicle for preselecting the degree of pressure in said chamber, and means under control of said first-named manual control member for releasing said selected pressure to effect advance operation of the trailer power device.

12. In a tractor trailer braking system having a power device for operating the trailer brakes, a power device for operating the tractor brakes, a manually operable control member and a control valve responsive to operation of said control member for controlling the actuation of both the tractor and trailer power devices; means for actuating the trailer power device in advance of the tractor power device comprising an advance valve unit having a compartment, a pressure responsive member dividing said compartment into two variable volume chambers, one of said chambers being adapted to have established therein a supply of air at sub-atmospheric pressure for advance trailer braking and the other of said chambers being adapted to communicate with a controlled pressure, co-acting valve members operatively carried by said pressure responsive member and adjustable to vary the pressure in said one of said chambers, a manual control member located within reach of an operator of the tractor for preselecting the degree of pressure in said one of said chambers, and a valve under control of said first-named manual control member for releasing said established air supply to effect advance operation of the trailer power device.

References Cited in the file of this patent

UNITED STATES PATENTS

| Number | Name | Date |
|---|---|---|
| 1,887,750 | Bragg et al. | Nov. 15, 1932 |
| 2,206,656 | Boldt | July 2, 1940 |
| 2,429,194 | Price | Oct. 14, 1947 |
| 2,527,883 | Ingres et al. | Oct. 31, 1950 |
| 2,569,610 | Ingres | Oct. 2, 1951 |
| 2,571,885 | Ingres | Oct. 16, 1951 |
| 2,581,107 | Ingres et al. | Jan. 1, 1952 |